US012209229B2

(12) United States Patent
Stewart et al.

(10) Patent No.: US 12,209,229 B2
(45) Date of Patent: Jan. 28, 2025

(54) METHOD AND COMPOSITIONS FOR CLEANING ALUMINUM CANS

(71) Applicant: HOUGHTON TECHNICAL CORP., Wilmington, DE (US)

(72) Inventors: Laine Stewart, Safety Beach (AU); Michael E. Smith, Downingtown, PA (US); Kimberly A. Kontra, Downingtown, PA (US); Richard Hills, Box Hill North (AU)

(73) Assignee: HOUGHTON TECHNICAL CORP., Wilmington, DE (US)

( * ) Notice: Subject to any disclaimer, the term of this patent is extended or adjusted under 35 U.S.C. 154(b) by 112 days.

(21) Appl. No.: 17/556,582

(22) Filed: Dec. 20, 2021

(65) Prior Publication Data

US 2022/0112448 A1 Apr. 14, 2022

Related U.S. Application Data

(62) Division of application No. 16/768,374, filed as application No. PCT/US2018/063040 on Nov. 29, 2018, now Pat. No. 11,535,818.

(Continued)

(51) Int. Cl.

| | |
|---|---|
| ***C11D 3/02*** | (2006.01) |
| ***C11D 1/00*** | (2006.01) |
| ***C11D 3/04*** | (2006.01) |
| ***C11D 3/24*** | (2006.01) |
| ***C11D 3/30*** | (2006.01) |
| ***C11D 7/04*** | (2006.01) |

(52) U.S. Cl.

CPC ................ *C11D 3/042* (2013.01); *C11D 1/00* (2013.01); *C11D 3/04* (2013.01); *C11D 3/044* (2013.01); *C11D 3/046* (2013.01); *C11D 3/245* (2013.01); *C11D 2111/16* (2024.01); *C11D 2111/44* (2024.01)

(58) Field of Classification Search

CPC .. C11D 1/00; C11D 3/04; C11D 3/046; C11D 3/042; C11D 3/245

USPC ................ 510/245, 254, 257, 269, 272, 492

See application file for complete search history.

(56) References Cited

U.S. PATENT DOCUMENTS 3,140,203 A 7/1964 Grunwald
4,009,115 A 2/1977 Binns (Continued)

FOREIGN PATENT DOCUMENTS

DE 102013226533 A1 6/2015
GB 2186292 A 8/1987
WO 1997013005 A1 4/1997

OTHER PUBLICATIONS

Office Action for Japanese Patent Application No. 2020-548871, mailed Nov. 22, 2021.
Examination Report No. 2 for Australian Patent Application No. 2018375402, dated Dec. 20, 2021.
International Search Report mailed Feb. 8, 2019 in connection with International Patent Application No. PCT/US2018/063040.

(Continued)

*Primary Examiner* — Gregory R Delcotto
(74) *Attorney, Agent, or Firm* — Morgan, Lewis & Bockius LLP

(57) ABSTRACT

A composition, kit and method useful in a multi-stage washing method for cleaning an aluminum or aluminum alloy containers while reducing hazardous exposure of workers to toxic levels of hydrogen fluoride or ammonium bifluoride employs a stable, neutralized ammonium bifluoride-containing accelerator solution for addition to an acidic wash solution.

4 Claims, 10 Drawing Sheets

Related U.S. Application Data

(60) Provisional application No. 62/593,650, filed on Dec. 1, 2017.

(56) References Cited

U.S. PATENT DOCUMENTS

| | | | | |
|---|---|---|---|---|
| 5,538,600 | A | 7/1996 | Schultz et al. | |
| 6,432,899 | B1 | 8/2002 | Sjostrom | |
| 6,465,404 | B2 | 10/2002 | Scriven, II et al. | |
| 7,888,302 | B2 * | 2/2011 | Wu | C11D 7/3281 510/176 |
| 11,535,818 | B2 * | 12/2022 | Stewart | C11D 11/0064 |
| 2002/0016281 | A1 | 2/2002 | Scriven, II et al. | |
| 2015/0315712 | A1 | 11/2015 | Hawes | |
| 2015/0329973 | A1 | 11/2015 | Basaly | |

OTHER PUBLICATIONS

Written Opinion mailed Feb. 8, 2019 in connection with International Patent Application No. PCT/US2018/063040.

Office Action issued in corresponding Brazilian Application No. BR112020011036-1, dated Nov. 29, 2023, with English Summary, 6 pages.

Examination Report issued in corresponding European Application No. 18882637.4, dated Oct. 17, 2023, 3 pages.

Office Action for Japanese Patent Application No. 2020-548871 mailed Jul. 7, 2021, 11 pages.

Office Action for Australian Patent Application No. 2018375402 dated Jul. 26, 2021, 3 pages.

Extended European Search Report for European Patent Application No. 18882637.4 dated Aug. 9, 2021, 6 pages.

* cited by examiner

METHOD AND COMPOSITIONS FOR CLEANING ALUMINUM CANS

CROSS-REFERENCE TO RELATED APPLICATIONS

This application is a divisional of U.S. patent application Ser. No. 16/768,374 filed May 29, 2020, which is a U.S. National Stage application of International Patent Application No. PCT/US2018/063040 filed Nov. 29, 2018, which claims the benefit of the priority of U.S. Provisional Patent Application No. 62/593,650, filed Dec. 1, 2017, which applications are incorporated herein by reference in their entireties.

BACKGROUND OF THE INVENTION

Containers comprised of aluminum and alloys thereof are produced in a drawing and forming operation, referred to as drawing and ironing, which results in the deposition of lubricants and forming oils on the surface. In addition, residual aluminum fines, i.e. small particles of aluminum, are deposited on the interior and exterior surfaces of the container during the forming operation. See, e.g., U.S. Pat. No. 9,447,507. After being cast or formed into desired shapes, aluminum surfaces are generally cleaned using a variety of alkaline or acidic cleaning solutions to remove contaminants, degrease, rinse, and deoxidize the surface. Thereafter protective coatings can be applied. Acid cleaners have been employed to clean the aluminum surfaces and to remove aluminum fines deposited on the interior walls of aluminum containers. Acid cleaning is ordinarily accomplished at temperatures from 55° C. to 70° C. to remove or dissolve the aluminum fines and to remove the lubricants and forming oils so that the surface is rendered water-break-free. Various components can be added to the cleaners to increase their ability to remove oxide contaminants. For example, in one example, U.S. Pat. No. 4,614,607 refers to a composition suitable for treating metals comprising an acidic nitrate solution, sulfuric acid and ammonium bifluoride, further including ammonium nitrate or another soluble nitrate salt. A gelled deoxidizer described therein comprises an aqueous solution of nitric acid sulfuric acid ammonium bifluoride and fumed silica.

Still other methods of cleaning aluminum have used alkaline conditions, such as described in U.S. Pat. No. 9,732,428, and other publications or fluoride-free systems, such as described in U.S. Pat. No. 6,432,899 or 6,001,186. However, alkaline technologies require considerable control to be exercised over the conditions in the plants. Fluoride-free systems result in cans that are darker in color, and thus not appealing to the industry.

Despite these alternative methods, the industry continues to favor the use of acidic wash solutions to which are added the deoxidizers, hydrogen fluoride or ammonium bifluoride, in multi-stage aluminum can washing methods to preserve the color and brightness of the can. These processes require workers in the cleaning plant to routinely handle the extremely hazardous hydrogen fluoride or ammonium bifluoride compounds as these additives are required to be periodically added to the acid wash. These methods routinely expose the workers in the aluminum cleaning plants to extremely hazardous and possible fatal exposure risks.

SUMMARY OF THE INVENTION

In one aspect, a multi-stage washing method for cleaning an aluminum or aluminum alloy container comprises adding to an acidic wash stage solution having no fluoride ions and having a pH≤2.5 a neutralized fluoride-containing accelerator solution in an amount sufficient to supply the resulting wash stage solution with a range of between and including 3 to 15 ppm fluoride ion without altering the pH. This process can be used without causing or generating levels of hydrogen fluoride or ammonium bifluoride toxic to humans. In one embodiment, this method can be performed without exposing humans to increased levels of hydrogen fluoride or ammonium bifluoride toxic to humans. In one embodiment, the accelerator solution contains a range of between and including about 10 to 20% by weight potassium fluoride and a range of between and including about 10 to 20% by weight ammonium fluoride in water. In another embodiment, the potassium fluoride to ammonium fluoride concentrations by weight in the neutral accelerator is a ratio of 1.7:1 to 1.5:1.

In another aspect, a method for reducing the toxicity of an aluminum or aluminum alloy container washing process comprises adding to an acidic wash stage solution having no fluoride ions and having a pH≤2.5 a neutralized fluoride-containing accelerator solution in an amount sufficient to supply the wash stage with a range of between and including 3 to 15 ppm fluoride ion without altering the pH and without exposing workers to increased toxicity levels of hydrofluoric acid or ammonium bifluoride solution.

In still a further aspect, a product or kit for cleaning aluminum or aluminum alloy containers comprises: (a) a first container comprising an acidic wash stage solution having no fluoride ions; and (b) a second container comprising a stable accelerator, neutralized ammonium bifluoride-containing solution having a pH of between and including about 6-7. The admixture of (b) with (a) forms a cleaning composition that removes organic and inorganic contaminants from the containers and reduces exposure of workers to toxic levels of hydrogen fluoride or ammonium bifluoride.

In still another aspect, a method for cleaning and/or deoxidizing aluminum or aluminum alloy containers, without causing or generating, or exposing workers to toxic levels of hydrogen fluoride or ammonium bifluoride, employs the product or kit as described herein.

In another aspect, a multi-stage washing method for cleaning an aluminum or aluminum alloy container comprises adding to an acidic wash stage solution having no fluoride ions and having a pH≤2.5 a potassium fluoride-containing accelerator solution in an amount sufficient to supply the resulting wash stage solution with a range of between and including 3 to 15 ppm fluoride ion without altering the pH.

In another aspect, a method for reducing the toxicity of an aluminum or aluminum alloy container washing process comprises adding to an acidic wash stage solution having no fluoride ions and having a pH≤2.5 a potassium fluoride solution in an amount sufficient to supply the wash stage with a range of between and including 3 to 15 ppm fluoride ion without altering the pH and without exposing workers to increased toxicity levels of hydrofluoric acid or ammonium bifluoride solution.

Other aspects and advantages of the invention will be clear from the following detailed description of the invention.

DETAILED DESCRIPTION OF THE FIGURES

FIG. 1 is a flow chart of a typical multi-stage aluminum wash process, showing the Stage 2 "acid" wash which is the point at which the neutral accelerator is added.

FIG. 2 is a bar graph showing oxide removal from aluminum metal substrate washed in a multi-stage process using the sulfuric acid solution Acid Cleaner A (which contains sulphuric acid at a weight percent of between 25-50% and alcohols, 02-13, branched and linear, ethoxylated at a weight percent of 2.5-10%) at 1% dilution admixed with an ammonium bifluoride (SOLUTION C, an about 20% by weight ammonium hydrogen difluoride) solution or the neutral accelerator DA-ACP-112. The leftmost graph shows percentage Al mass loss washed with a control (left bar) vs. the acid solution with no fluoride ion added (right bar). The middle graph shows the percentage Al mass loss washed with the control plus the SOLUTION C (left bar) vs. the acid solution with SOLUTION C added (right bar). The rightmost bar shows that the addition of the neutral accelerator to the control (left bar) as well as to the acid solution (right bar) produces better oxide removal in addition to safety.

DETAILED DESCRIPTION OF THE INVENTION

To resolve the problems in the art, a multi-stage washing method for cleaning an aluminum or aluminum alloy container is designed to use a neutralized fluoride-containing accelerator solution with a non-fluoride-containing acidic wash bath for aluminum metals. The accelerator is used in an amount sufficient to supply the resulting wash stage solution with between 3 to 15 ppm fluoride ion without altering the pH and without exposing humans to increased levels of hydrogen fluoride or ammonium bifluoride toxic to humans.

Definitions and/or Components of the Methods and Compositions

The term “aluminum metal” or “aluminum alloy” or “aluminum” or “aluminum can” or aluminum substrate” are used interchangeably herein and refer to materials composed of the single metallic element, AL or metals containing more than one metal element, i.e., a metal alloy. Specific examples of aluminum alloys that can be treated with the compositions described herein include those described in the “Handbook of Hydraulic Fluid Technology”, $2^{nd}$ ed., Totten, CRC Press, 2011, which is herein incorporated by reference. Such metals can take the forms of cans, such as those used in a variety of beverage and industrial container fields.

The phrase “in contact with”, when utilized to refer to an aluminum metal’s interaction with the cleaning fluid described herein, includes any point of contact of the metal with the cleaning fluid. In one embodiment, the cleaning fluid is applied to the metal via spraying. Other conventional techniques can be used, including without limitation, coating, contact rolling, squeegeeing, dipping, brushing, flooding, or immersion application techniques.

Figure 1:
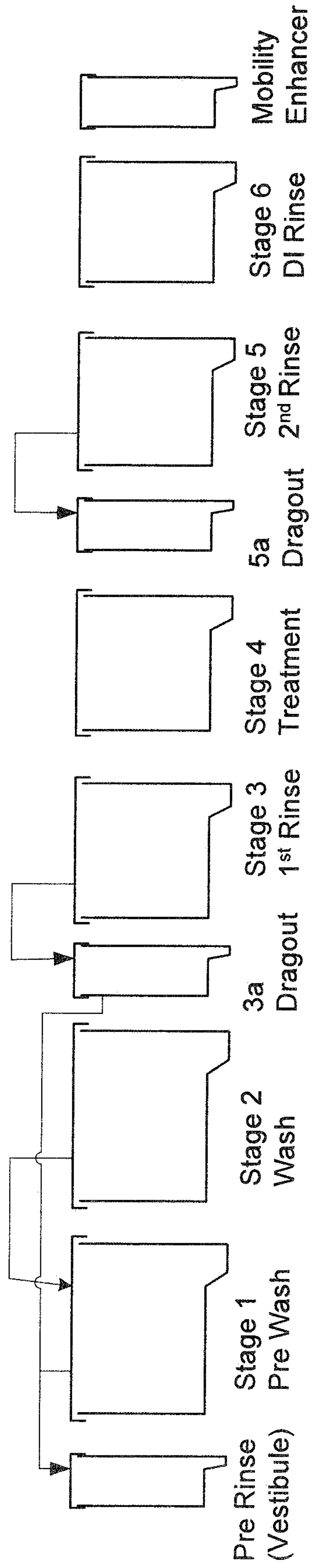

The term “multi-stage washing method” as used herein refers to the sequence of steps undertaken to prepare aluminum cans (or other aluminum substrates) for use, while preserving their color, brightness and finish. Such a process is depicted in FIG. 1, and involves sequential and repeated steps of washing with acid solution, rinsing with water or deionized water, and optionally treating aluminum with conversion coatings or mobility enhancers. An example of such a process is described in Example 3.

Hazardous classifications referred to herein include references to the Hazard Statements (H-statements), which are part of the Globally Harmonized System of Classification and Labeling of Chemicals (GHS). See, e.g., the link www.ilpi.com/msds/ref/ghs.html. Such statements include statements or classifications: H310, fatal in contact with skin; H314, causes severe skin burns and eye damage; H301 toxic if swallowed; H331, toxic if inhaled. Hydrogen fluoride and ammonium bifluoride and mixtures of these chemicals are classified under these above-mentioned statements or classifications. Additional classifications indicative of less toxic materials are H302, harmful if swallowed; H318, causes serious eye damage; and H332, harmful if inhaled. H300 indicates fatal if swallowed, like certain acids.

It should be understood that while various embodiments in the specification are presented using “comprising” language, under various circumstances, a related embodiment is also described using “consisting of” or “consisting essentially of” language. It is to be noted that the term “a” or “an” refers to one or more. As such, the terms “a” (or “an”), “one or more,” and “at least one” are used interchangeably herein As used herein, the term “about” means a variability of 10% from the reference given, unless otherwise specified.

Unless defined otherwise in this specification, technical and scientific terms used herein have the same meaning as commonly understood by one of ordinary skill in the art to which this invention belongs and by reference to published texts, which provide one skilled in the art with a general guide to many of the terms used in the present application.

The Neutral or Reduced Hazard Accelerator

The accelerator solution is a stable, aqueous fluoride-containing solution which can remove oxides produced during the aluminum metal forming process and prepares the surface of the aluminum metal surface for further treatment. The accelerator solution is stable at between 0 to 50° F. and has a pH of between and including about 6 to 7. In one embodiment, the accelerator has a pH less than 7.0. In other embodiments, the pH of the accelerator is about 6, 6.1, 6.2, 6.3, 6.4, 6.5, 6.6, 6.7, 6.8, 6.9, or 7.0, including any numbers or fractional numbers therebetween. In one embodiment, the aqueous fluoride-containing solution is a neutralized solution of ammonium bifluoride. In another embodiment, the accelerator solution contains ammonium fluoride and potassium fluoride. In another embodiment, the solution is a neutralized solution of ammonium bifluoride containing ammonium fluoride and potassium fluoride.

In one embodiment, an accelerator solution is created by dissolving ammonium bifluoride in water. The ammonium bifluoride dissociates in water to generate excess hydrogen fluoride. The excess HF is neutralized by the slow addition of potassium hydroxide, which generates a solution containing the salts, potassium fluoride and ammonium fluoride. In one embodiment, the accelerator solution is formed by admixture of about 17% by weight ammonium bifluoride in water and a solution of about 45% potassium hydroxide in water until the excess HF is neutralized.

In one embodiment, the accelerator solution contains about 10% to about 20% by weight potassium fluoride and about 10 to about 20% by weight ammonium fluoride in water. Such solutions can contain at least 10, 11, 12, 13, 14, 15, 16, 17, 18, 19 to about 20% by weight of potassium fluoride, including fractional volumes therebetween. Such solutions can contain at least 10, 11, 12, 13, 14, 15, 16, 17, 18, 19 to about 20% by weight of ammonium fluoride, including fractional volumes therebetween. In yet another embodiment, the neutral accelerator contains about 18% by weight potassium fluoride and about 11% by weight ammonium fluoride, with the balance water. In another embodiment, the potassium fluoride to ammonium fluoride concentrations by weight in the neutral accelerator is a ratio of 1.7:1. In another embodiment, the potassium fluoride to ammonium fluoride concentrations by weight in the neutral accelerator is a ratio of to 1.6:1. In another embodiment, the potassium fluoride to ammonium fluoride concentrations by weight in the neutral accelerator is a ratio of to 1.5:1. Still other effective accelerators can be prepared by altering these concentrations within the stated parameters.

In one embodiment, the accelerator solution is created by dilution of hydrogen fluoride. It was noted that the use of bases such as potassium carbonate, sodium hydroxide and sodium carbonate, for example, produce undesirable results in formulation of a neutral accelerator. These bases resulted in violent reactions, or instability and dropout (solubility) issues.

As demonstrated below, an example of a neutral accelerator is referred to as DA-ACP-112.

The Kit

Another aspect of this invention is a kit for cleaning aluminum or aluminum alloy containers. This kit comprises a first container comprising an acidic wash stage solution concentrate having no fluoride ions. In one embodiment the first container contains a solution that comprises a range of between and including about 30 to about 50% by weight sulfuric acid and a range of between and including about 4 to about 20% surfactant by weight in water. In another embodiment the first container contains a solution that comprises a range of between and including about 35 to about 40% by weight sulfuric acid and a range of between and including about 10-15% surfactant by weight in water. In still other embodiments, the acidic wash concentrate contains about 30, 31, 32, 33, 34, 35, 36, 37, 38, 39, 40, 41, 42, 43, 44, 45, 46, 47, 48, 49 or about 50% by weight of the acid, including fractional numbers therebetween. The surfactant component of such acidic wash concentrates is present at about 4, 5, 6, 7, 8, 9, 10, 11, 12, 13, 14, 15, 16, 17, 18 19 or 20% by weight, including any whole or fractional numbers between the stated whole numbers. In one embodiment a suitable surfactant is composed of a mixture of C12-C13 branched and linear alcohols, of which some are ethoxylated. Other similar surfactants are likely to be useful.

In yet one embodiment, a suitable acidic cleaner concentrate with surfactants are referred to as Acid Cleaner D (which contains about 35% sulphuric acid with about 10% surfactants) or Acid Cleaner A (which contains sulphuric acid at a weight percent of between 25-50% and alcohols, 02-13, branched and linear, ethoxylated at a weight percent of 2.5-10%). Still other acid cleaners are available in the art. It is also anticipated that, if desirable, phosphoric acid or hydrochloric acid could be used to form the acidic solution.

The kit also comprises a second container comprising the neutral accelerator described above, i.e., a stable neutralized ammonium bifluoride-containing solution having a pH of between about 6-7. In one embodiment, the aqueous fluoride-containing solution is a neutralized solution of ammonium bifluoride. In another embodiment, the accelerator solution contains ammonium fluoride and potassium fluoride. In another embodiment, the solution is a neutralized solution of ammonium bifluoride containing ammonium fluoride and potassium fluoride. In one embodiment, the accelerator solution is formed by admixture of about 17% by weight ammonium bifluoride in water and a solution of about 45% potassium hydroxide in water, with the potassium hydroxide added slowly until all of the HF is neutralized. In one embodiment, the accelerator solution contains about 10 to about 20% by weight potassium fluoride and about 10 to about 20% by weight ammonium fluoride in water. In yet another embodiment, the neutral accelerator contains about 18% by weight potassium fluoride and about 11% by weight ammonium fluoride, with the balance water.

In use, the admixture of the accelerator with an about 1% by weight dilution of the acidic solution of the first container forms a cleaning composition that removes organic and inorganic contaminants from said containers without exposure of workers to toxic levels of hydrogen fluoride or ammonium bifluoride.

Methods of Use

Yet another aspect of the invention is a multi-stage washing method for cleaning an aluminum or aluminum alloy container. This method comprises an acidic wash solution formed by an about 1% dilution in water of the acidic wash concentrate, such as described above having no fluoride ions, resulting in an "in-use" cleaning solution having a pH≤2.5. In certain embodiments, the pH of the diluted acid solution is 1, 1.1, 1.2, 1.3, 1.4, 1.5, 1.6, 1.7, 1.8, 1.9, 2.0, 2.1, 2.2, 2.3, 2.4, or 2.5, or fractional numbers therebetween.

To the acidic wash solution is added the neutral fluoride-containing accelerator solution in an amount sufficient to supply the resulting fluoride-containing wash stage solution with between 3 to 15 ppm fluoride ion without altering the pH of the acidic wash solution. In one embodiment, the amount of the accelerator added to the wash solution results in between 5 to 6 ppm fluoride ion. In other embodiments, the amount of fluoride ion in the wash solution is 3, 4, 5, 6, 7, 8, 9, 10, 11, 12, 13, 14, or 15 ppm, including fractional amounts therebetween. The addition of the neutral accelerator is performed on a periodic basis as the fluoride ion is depleted. Use of the neutral accelerator does not require the works to generate extremely hazardous levels of hydrogen fluoride or ammonium bifluoride in the wash solution. More significantly, the neutral accelerator does not require the workers to handle or be exposed to the extremely hazardous levels of hydrogen fluoride or ammonium bifluoride.

The multi-stage method further comprises spraying the resulting fluoride ion-containing wash stage solution onto the container to remove contaminants and oxides from the container. In one embodiment, the method is conducted by spraying the resulting wash solution onto the surface of the contained at a temperature of about 55, 56, 57, 58, 59, or about 60° C. In certain embodiment, the spraying occurs for about 50, 60, 70, 80 or about 90 seconds, or amounts of times therebetween.

In one embodiment of a multi-stage process, the fluoride ion-containing wash stage solution is rinsed from the container along with removed organic and inorganic contaminants. Such a multi-stage process can include one or more additional steps preceding the wash step, e.g., a pre-rinse, degreasing or pre-wash step. In another embodiment, a multi-stage wash process can include multiple rinses following the acidic wash. In some embodiments, the rinsing employs deionized water. In still additional embodiments, the multi-stage process employs a treatment or conversion coating step, and one or more optional subsequent rinses.

In yet another aspect, a method for decreasing the toxicity of an aluminum or aluminum alloy container washing process comprising adding to an acidic wash stage solution having no fluoride ions and having a pH≤2.5 a neutralized fluoride-containing solution in an amount sufficient to supply the wash stage with between 3 to 15 ppm fluoride ion without altering the pH and without exposing workers to toxic levels of hydrogen fluoride or ammonium bifluoride solution. As described herein, the acidic wash solution comprises about 35-40% sulfuric acid and about 10-15% surfactant in water at a pH of between and including 1.5 to 2. The accelerator is as described above.

In still another aspect, therefore, a method for cleaning and/or deoxidizing aluminum or aluminum alloy containers without causing or generating toxic levels of hydrogen fluoride or ammonium bifluoride is accomplished using the product or kit as described herein.

In yet another aspect, a method for cleaning and/or deoxidizing aluminum or aluminum alloy containers without causing or generating toxic levels of hydrogen fluoride or ammonium bifluoride is accomplished using potassium fluoride alone (at a concentration of 30% or less) in place of either ammonium bifluoride or the neutral accelerator described above. Use of a KF solution greater than 30% presents toxicity and stability issues. Use of a KF solution much less than 30% requires a considerable excess of the solution to function as a suitable oxide remover/acid cleaner.

The advantage of the products and methods described herein is that there is no requirement for additional admixture of the wash stage solution with sulfuric acid, hydrofluoric acid, or hydrogen fluoride and the admixture and use in the process of cleaning the aluminum containers does not generate toxic levels of HF. The risk of hazard caused by contact with toxic chemicals in this acidic environment is reduced significantly to the benefit of the factory worker exposed to toxic levels of these compounds.

Use of the neutral accelerator converts HF, which is present either in the HF or NH4HF2, to potassium fluoride and water. At the neutral pH of the accelerator, any HF2 dissociates into protective neutral barriers, F− and H+ are released in the stage 2 bath at the ppm level, e.g., 5-10 ppm. The neutral accelerator increases the safety for the worker without decreasing the quality of the resulting cleaned aluminum metal product.

In contrast, commonly used high percentage additives of hydrogen fluoride (>20% by weight) or ammonium bifluoride for such uses have a high toxicity, requiring considerable administration and engineering controls to be imposed upon the multi-stage process at great risk to the worker. Use of these components directly generates the reactions:

$$\mathrm{NH4HF2} \leftrightarrow \mathrm{NH_4^+} + [\mathrm{HF2}]^- \cdot \mathrm{HF2} \leftrightarrow \mathrm{H^+F^-} + \mathrm{F^-}$$

In terms of hazardous exposure to humans, the differences are striking. The use of a high percentage ammonium bifluoride solution is characterized by the hazard statement H310—fatal in contact with skin, as well as H301, H331 and H314 defined above. The use of the neutral accelerator in the cleaning process reduces the toxicity of the process from H301 to H302 (toxic to harmful, respectively, if swallowed); from H310 to H312 (fatal to harmful, respectively, if contact with skin); from H331 to H332, Toxic to harmful, respectively, if inhaled) and from H314 to H318 (from causes severe skin burns and severe eye damage to causes serious eye damage, respectively).

The following examples are illustrative only and are not intended to limit the present invention. As used in the following examples, the terms are defined as follows:

SOLUTION B refers to a solution of 20% hydrogen fluoride;

SOLUTION C™ refers to a solution containing 10-25% by weight ammonium hydrogen difluoride (CAS 1341-49-7) and 2.5-10% by weight hydrogen fluoride (CAS No. 7664-39-3);

Acid Cleaner A refers to a solution containing sulphuric acid at a weight percent of between 25-50% and alcohols, C12-13, branched and linear, ethoxylated at a weight percent of 2.5-10%; and DA-ACP-112 is a solution (a neutral accelerator of the invention) containing between 10 to 20% by weight potassium fluoride (CAS No. 7789-23-3) and between 10 to 20% by weight ammonium fluoride (CAS No. 12125-01-8) in water.

Example 1: The Neutral Accelerator

A neutral fluoride based accelerator is designed for the removal of oxides from draw and ironed aluminum cans. It is formulated to reduce the hazard rating from H310 (fatal in contact with skin) to H312 (harmful in contact with skin). This accelerator is produced by dissolving ammonium bifluoride (about 17% by weight) in water, which generating HF, a hazardous material at levels greater than 5000 ppm.

$$\mathrm{NH4HF2} \leftrightarrow \mathrm{NH_4^+} + [\mathrm{HF2}]- \text{ and } \mathrm{HF2} \leftrightarrow \mathrm{H^+F^-} + \mathrm{F^-}$$

To neutralize the toxic levels of HF, potassium hydroxide solution (about 45% by weight in water) is added slowly to the dissolving ammonium bifluoride, while monitoring pH to ensure a final range of 6.0 to 7.0.

$$\mathrm{HF} + \mathrm{KOH} \rightarrow \mathrm{KF} - + \mathrm{H_2O}$$

The resulting accelerator solution DA-ACP-112 contains between 10 to 20% by weight potassium fluoride (CAS No. 7789-23-3) and between 10 to 20% by weight ammonium fluoride (CAS No. 12125-01-8) in water. This solution has a pH of 6-7, a relative density of 1.18 and is soluble in water. It is stable under normal conditions (i.e., at a temperature of between 0 to 50 degrees Centigrade) and has no possibility of hazardous reactions under normal conditions.

Attempts to create a neutralized accelerator by use of sodium carbonate rather than potassium hydroxide were unsuccessful, leading to the determination that considerable carbon dioxide would be produced and sodium fluoride produced, which is not desirably soluble in water (data not shown).

Example 2: Trial of a Cleaning Method Using the Neutral Accelerator

A trial plant setup for aluminum cleaning entailed the following stages and products:

TABLE 1

| STAGE OF PROCESS | PRODUCT USED | Free Acid (FA) SPECIFICATION ml |
|---|---|---|
| 1 | Sulfuric Acid | 2.0-6.0 |
| 2 | Sulfuric Acid cleaner plus 20% hydrogen fluoride (SOLUTION B) | 4.0-10.0 Fluoride 4.0-12.0 ppm |
| 3A | water | rinse |
| 3B | water | rinse |
| 4 | Conversion Coating, such as CorCoat NC900 ™ | 0.5-1.2 |
| 5 | water | rinse(s) |
| 6 | Deionized water | rinses (to remove salts) |
| 7 | Optional mobility enhancer, e.g., Cor Rinse 62 ™ | — |

The set points (time of addition of the SOLUTION B) were 15000 mS for Acid Cleaner A acidic wash product and 10 seconds per 3000 cans for SOLUTION B.

The accelerator of Example 1 (DA-ACP-112) was placed online in the factory aluminum can cleaning process and the dosing setpoint (i.e., how much time the neutral accelerator is added to the acidic wash solution to keep appropriate Fl ion levels in bath) was raised from 10 seconds to 12 seconds to allow for the reduced fluoride content of the accelerator over SOLUTION B. Can quality remained consistent, i.e., water break free and visual inspection after stage 6.

Figure 5:
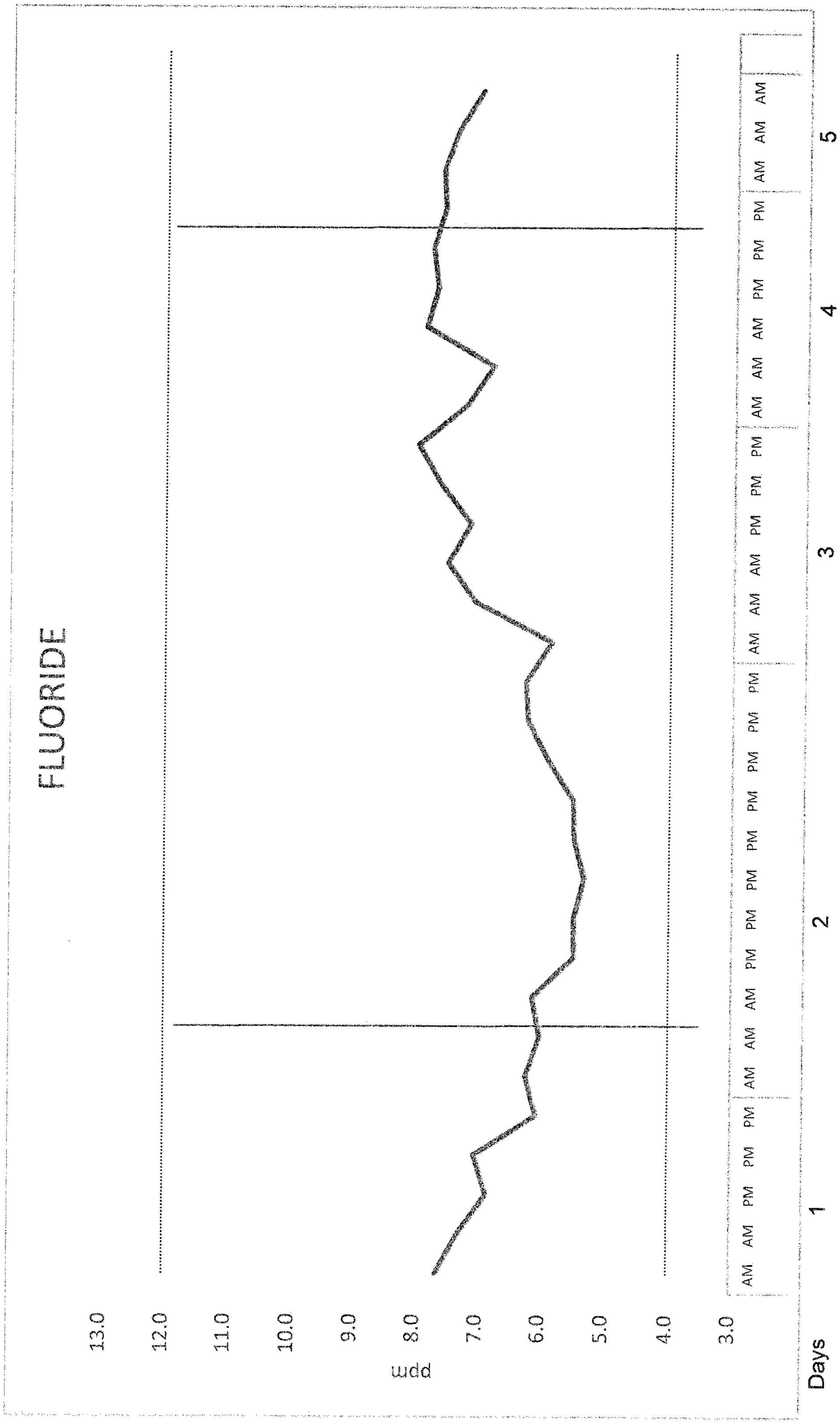
FIG. 5 is a graph of the level of fluoride ion present/consumed in the aluminum clean process detailed in Example 2.

Initially fluoride ppm levels decreased slightly (FIG. 5). Although still within quality control parameters, the dosing set point was further increased from 12 to 18 to 20 seconds.

Figure 4:
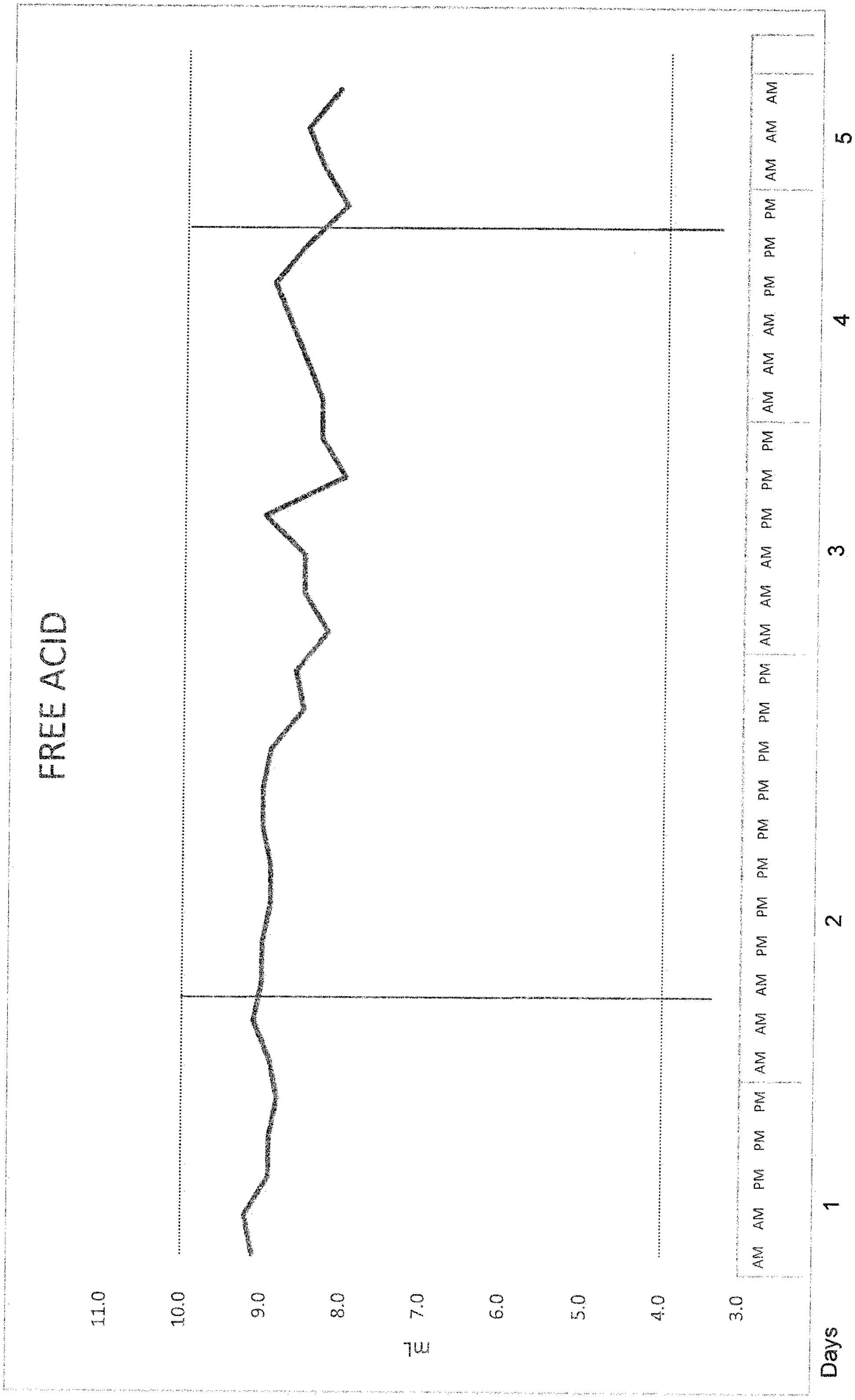
FIG. 4 is a graph of the level of free acid (FA) generated in the aluminum clean process detailed in Example 2.

On Day 2 of the same trial, the cans remained water break free and passed visual inspection, Fluoride and free acid (FA) remained consistent and within set parameters (FIGS. 4 and 5). Conductivity set point of stage 2 was raised to 15500 mS and then further to 17000 mS to maintain FA levels.

On Day 3 of the same trial, the cans remained water break free with no quality concerns, FA and Fluoride remained constant. When the accelerator was consumed, the SOLUTION B was placed back online. Fluoride set points were reduced back to 10 seconds and cleaner set point 16000 mS.

From Days 1-3 (about 60 hours), 4.62 mm cans were produced giving a consumption rate of 51 Kg/mm or 43 L/mm Consumption figures are an estimate based on short running time and the production figures available.

The fluoride set point was increased gradually over the first 24 hours from 10 sec per 3000 cans to 22 seconds. Although the dosing time was more than double, consumptions were only slightly increased. The higher dosing rate was required due to the lower fluoride content than SOLUTION B and the higher SG, the heavier fluid required more dosing time to pump the required volume of liquid.

Cleaner set points were raised from 15000 mS to 18000 mS over the duration of the trial. Consumptions were slightly increased over historical values. These values are an estimate only based on short running time and the production figures available. It is anticipated that additional examples will produce more accurate estimates.

pH remained consistent throughout the trial between all trials.

Figure 6:
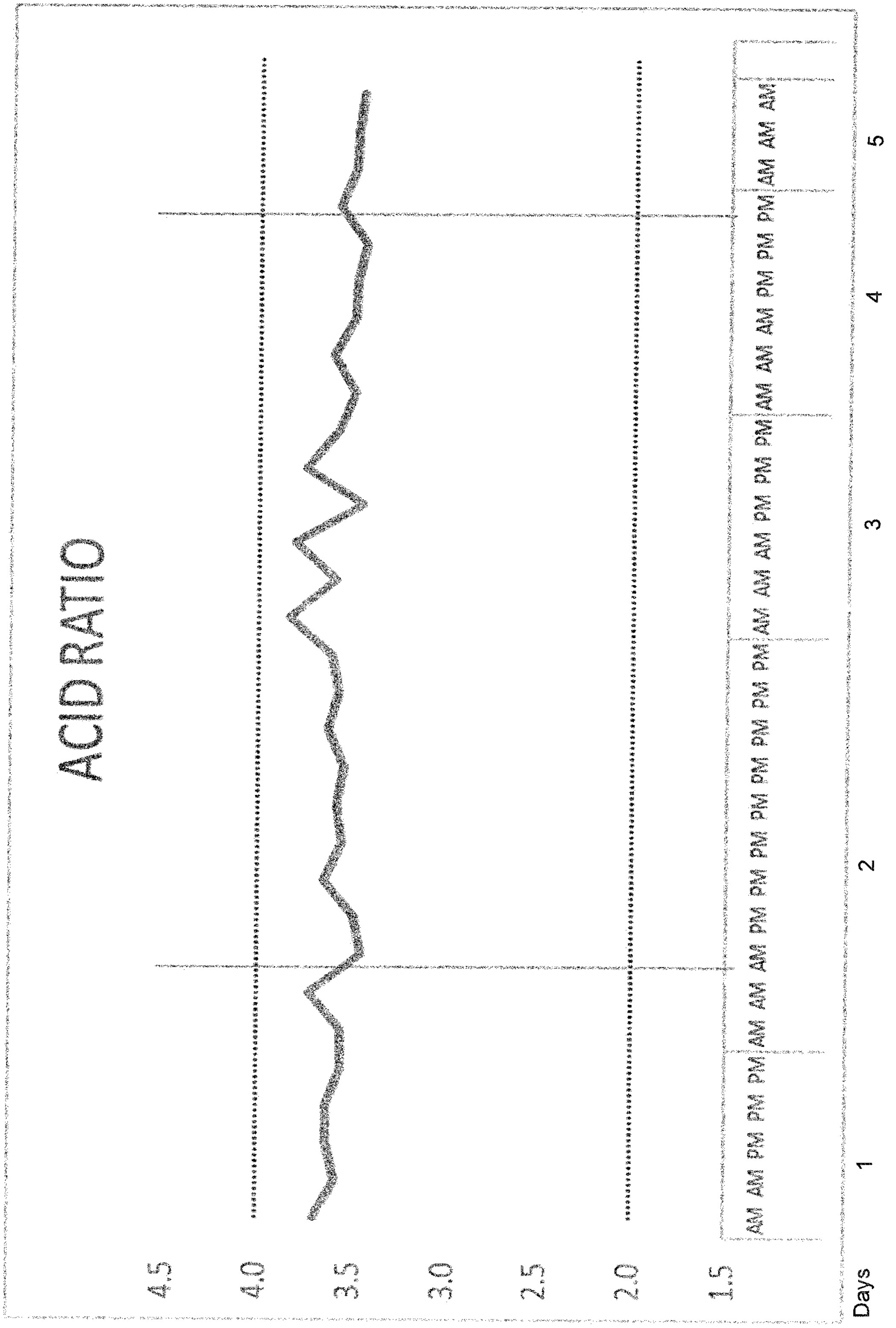
FIG. 6 is a graph of the acid ratio in the aluminum clean process detailed in Example 2.

Acid ratio remained consistent throughout the trial (FIG. 6)

Can quality remained consistent before during and after the trial. Can samples that were obtained before the trial for comparison were visually the same quality as during the trial period. ME values remained well below cut-off limits before during and after the trial period.

Example 3: Additional Laboratory Trials

Multiple laboratory tests were conducted to compare the efficacy of the neutralized accelerator of Example 1 with SOLUTION C™, which is a cleaning additive containing 10-25% by weight ammonium hydrogendifluoride (CAS 1341-49-7) and 2.5-10% by weight hydrogen fluoride (CAS No. 7664-39-3). This product has Hazard Classifications of H310, H314, H301 and H331, among others (as defined above).

Figure 2:
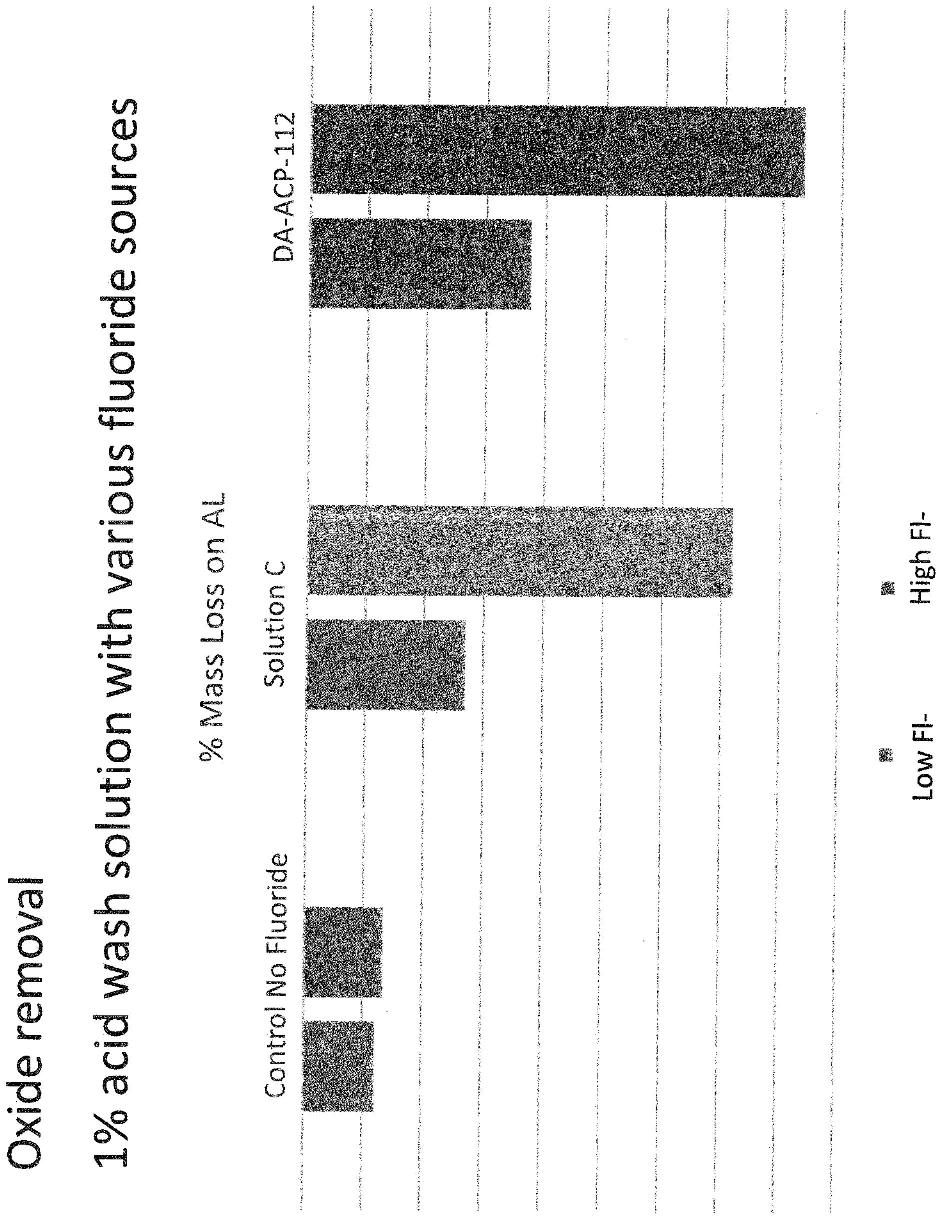

A laboratory test was conducted and oxide removal from aluminum metal substrate washed in a multi-stage process (such as described in FIG. 1) using the sulfuric acid solution Acid Cleaner A (which contains sulphuric acid at a weight percent of between 25-50% and alcohols, 02-13, branched and linear, ethoxylated at a weight percent of 2.5-10%) at 1% dilution admixed with SOLUTION C, an ammonium bifluoride solution, or the neutral accelerator DA-ACP-112 were measured. The results are shown in the graph of FIG. 2. The leftmost graph shows percentage Al mass loss washed with a control (left bar) vs. the acid solution with no fluoride ion added (right bar). The middle graph shows the percentage Al mass loss washed with the control plus the SOLUTION C (left bar) vs. the acid solution with SOLUTION C added (right bar). The rightmost bar shows that the addition of the neutral accelerator to the control (left bar) as well as to the acid solution (right bar) produces better oxide removal in addition to safety.

Similar mass loss percentage of fluoride ion tests were conducted with new solutions at 10 ppm, 100 ppm and 200 ppm. 10 ppm was not comparable as tests were run overnight due to very little mass change. The results are shown in the table below.

TABLE 2

| | Mass Loss of oxide | | |
|---|---|---|---|
| Fluoride ion conc (ppm) | Control/ no F ion | Acid solution with SOLUTION C | Acid solution with DA-ACP-112 |
| 100 | −0.60% | −1.34% | −1.88% |
| 200 | −0.67% | −3.60% | −4.18% |

Figure 3:
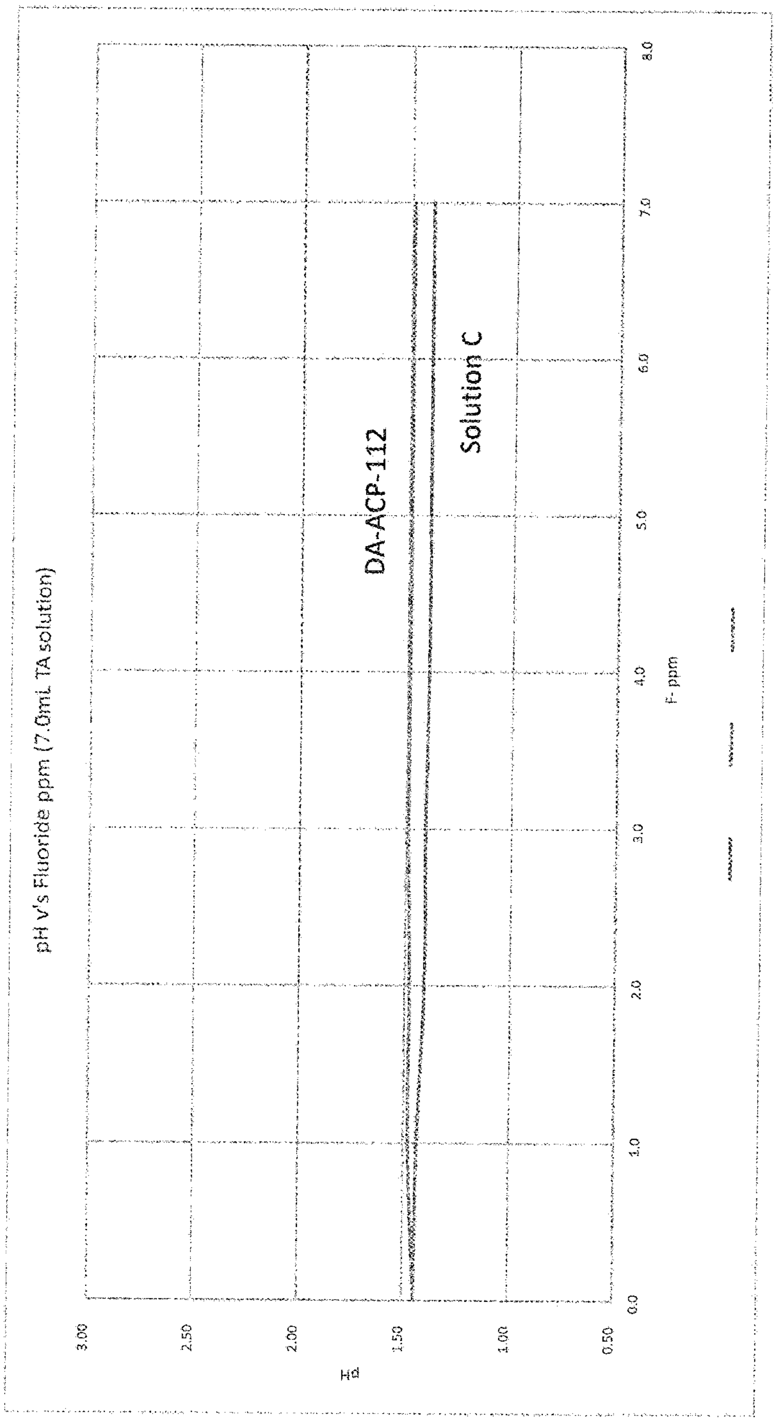
FIG. 3 is a graph showing that pH remained consistent in tests conducted on aluminum substrates using a test sulfuric acid solution to which is added either an ammonium bifluoride deoxidizer (SOLUTION C) or the neutral accelerator described herein.

Performing a laboratory comparative test in washing Al metal substrates with the acidic wash solution/accelerator or SOLUTION C combination (free acid=7.1) produced the results when measuring pH vs. fluoride ion ppm in a 7.0 mL test acid solution), as shown in FIG. 3 and in the table below.

TABLE 3

| F ion (ppm) | SOLUTION C (pH) | DA-ACP-112 (pH) |
|---|---|---|
| 0.0 | 1.45 | 1.45 |
| 1.0 | 1.44 | 1.48 |
| 2.0 | 1.41 | 1.48 |
| 3.0 | 1.41 | 1.49 |
| 4.0 | 1.40 | 1.49 |
| 5.0 | 1.40 | 1.49 |

TABLE 3-continued

| F ion (ppm) | SOLUTION C (pH) | DA-ACP-112 (pH) |
|---|---|---|
| 6.0 | 1.40 | 1.49 |
| 7.0 | 1.40 | 1.49 |

A test similar compared the use of SOLUTION B (an aqueous solution containing 10-25% by weight of hydrogen fluoride (CAS No. 7664-39-3), having the Hazard classifications, H300, H310, H314 and H330 as defined above with the use of ACC-3 or DA-ACP-112 additives.

TABLE 4

| F ion (ppm) | SOLUTION B (pH) | SOLUTION C (pH) | DA-ACP-112 (pH) |
|---|---|---|---|
| 0.0 | 1.65 | 1.65 | 1.65 |
| 0.1 | 1.65 | 1.65 | |
| 0.2 | 1.65 | 1.65 | |
| 0.3 | 1.65 | 1.65 | |
| 0.4 | 1.65 | 1.65 | |
| 0.5 | 1.65 | 1.68 | |
| 0.6 | 1.65 | | 1.67 |
| 0.7 | 1.65 | | |
| 0.8 | 1.65 | | |
| 0.9 | 1.65 | | |
| 1.0 | 1.68 | | 1.75 |
| 1.1 | | 1.75 | |
| 1.2 | | | |
| 1.3 | | | |
| 1.4 | 1.71 | | |
| 1.5 | | | 1.76 |
| 1.6 | | | 1.77 |
| 1.7 | | | 1.78 |
| 1.8 | 1.70 | | 1.8 |
| 1.9 | | 1.76 | 1.85 |

These tests demonstrate that the method of cleaning and treating Al substrates using an acid cleaner containing the neutral accelerator produces comparable (and slightly better) results that the use of the much more hazardous deoxidizers in similar acid solutions.

Example 4: Trial of a Cleaning Method Using the Neutral Accelerator

A trial plant setup for aluminum cleaning entails the following stages and products:

TABLE 5

| Stage of Process | Product Used | Free Acid (FA) (ml) |
|---|---|---|
| 1 | Sulfuric Acid | 2.0-6.0 FA |
| 2 | Sulfuric Acid cleaner plus either (a) 20% hydrogen fluoride SOLUTION B or (b) DA-ACP-112 | To provide a fluoride ion concentration of between about 4.0-12.0 ppm |
| 3A | water | rinse |
| 3B | water | rinse |
| 4 | conversion coating | <1.2 |
| 5 | water | rinse(s) |
| 6 | Deionized water | rinses (to remove salts) |
| 7 | Optional mobility enhancer | — |

The set points (time of addition of the SOLUTION B) are established for Acid Cleaner A acidic wash product and for SOLUTION B. After this system is used for a specified number of cans, the accelerator of Example 1 (DA-ACP-112) is placed online in the factory aluminum can cleaning process and a trial is conducted of the accelerator in the multi-wash process. The dosing setpoint (i.e., how much time the neutral accelerator is added to the acidic wash solution to keep appropriate F− ion levels in bath) is raised slightly to allow for the reduced fluoride content of the accelerator over SOLUTION B. Can quality remain consistent after stage 6. If the DA-ACP-112 causes fluoride ppm levels to decrease within quality control parameters, the dosing set point is further increased to provide slightly longer exposure to the acidic solution containing the accelerator.

It is expected that fluoride and free acid (FA) remain consistent and within the set parameters. Conductivity set point of stage 2 is raised, if necessary, to maintain FA levels. Consumption rates of F− ion are determined as an estimate based on running time and the production figures.

A higher dosing rate is likely to be required due to the lower fluoride content and higher SG of DA-ACP-112 compared to SOLUTION B. Heavier fluids require more dosing time to pump the required volume of liquid. Cleaner set points are raised over the duration of the trial.

It is anticipated that consumptions of $F^-$ are slightly increased over historical values; pH remains consistent; acid ratio remains consistent and can quality remain consistent before during and after exposure to DA-ACP-112. It is anticipated that can samples taken before the trial, e.g., when SOLUTION B is used for comparison, are visually the same quality as during the trial period. ME values are expected to remain below cut-off limits before during and after the trial period.

Example 5: Two Week Trial

DA-ACP-112 is a neutral fluoride based accelerator for the removal of oxides from draw and ironed aluminium cans. DA-ACP-112 is formulated to be non-toxic and reduce the hazard rating from H310 (Fatal in contact with skin) with SOLUTION B/3 down to H312 (Harmful in contact with skin).

The objectives of this test were to replace SOLUTION B on line 3 (50 cl) with DA-ACP-112, monitor the process and cans for Free Acid, Total Acid & Acid ratio, Fluoride (ppm), Can quality, visual, and Etch rates.

The line 3 parameters were:

TABLE 6

| LINE 3 Parameters | | |
|---|---|---|
| | Product | FA Specification mL |
| Stage 1 | Sulphuric Acid | 2.0-6.0 |
| Stage 2 | Acid Cleaner A/SOLUTION B | 4.0-10.0<br>Fluoride 4.0-12.0 ppm |
| Stage 3A | — | — |
| Stage 3B | — | — |
| Stage 4 | CorCoat NC900 | 0.5-1.2 |
| Stage 5 | — | — |
| Stage 6 | DI water | — |
| Stage 7 | Cor Rinse 62 | — |

The set points (time of addition of the SOLUTION B) were 13450 mS for Acid Cleaner A acidic wash product and 11 seconds per 3000 cans for SOLUTION B.

Figure 7:
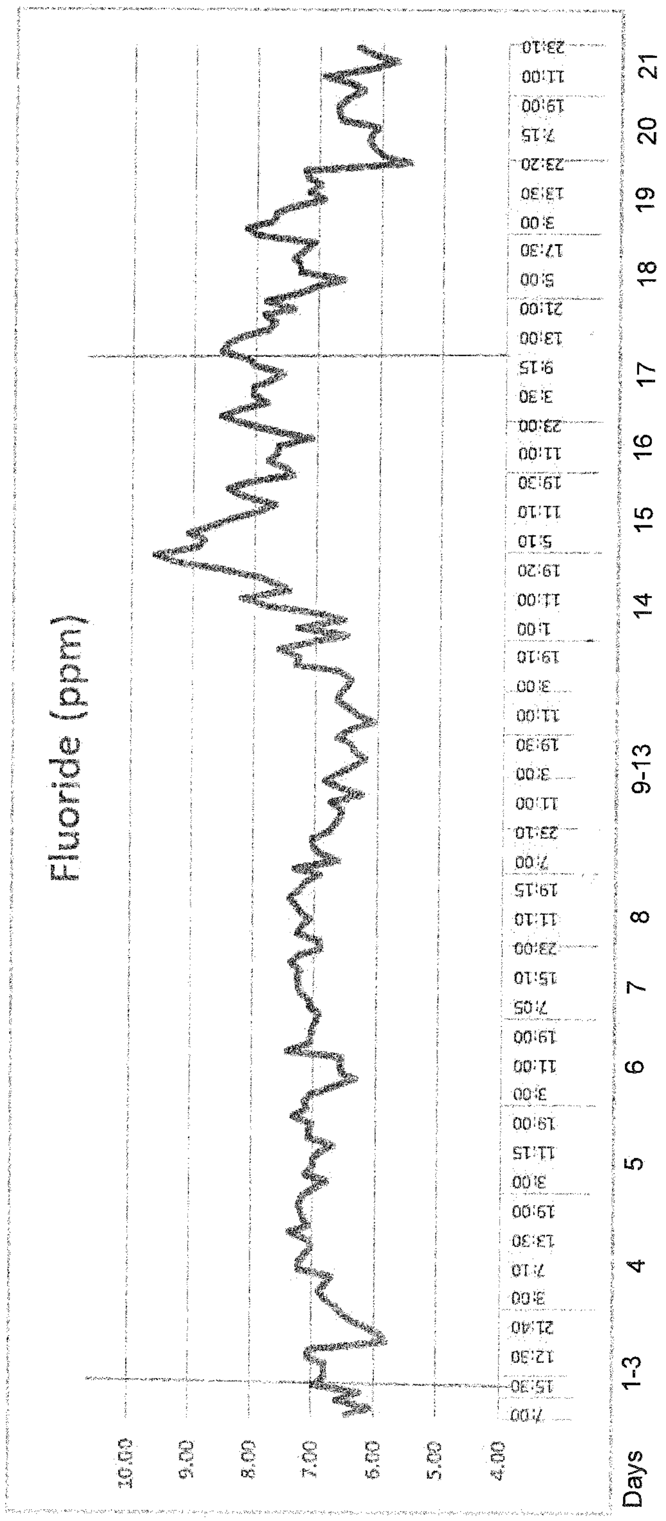
FIG. 7 is a graph of the level of fluoride ion present/consumed in the aluminum clean process detailed in Example 5.

DA-ACP-112 was placed online at 11:00 am Day 1, the dosing set point was raised from 11 seconds to 15 seconds to allow for the reduced fluoride content of DAACP-112 over SOLUTION B. Can quality remained consistent, water break free and clear finger wipe test ex stage 6. Initially fluoride ppm levels decreased slightly (FIG. 7). Although still within QC parameters the dosing set point was further increased from 15 to 18 seconds.

Figure 8:
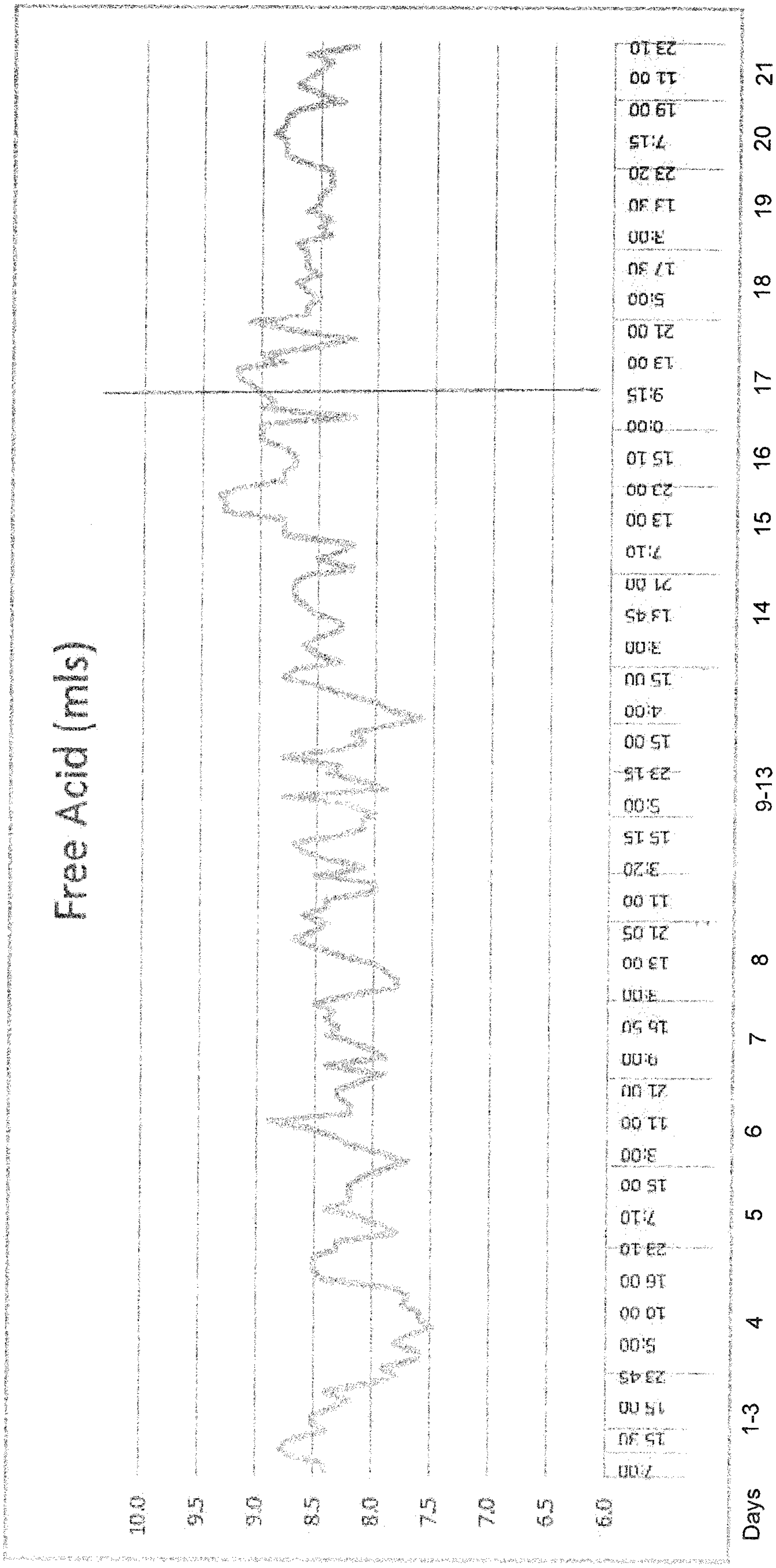
FIG. 8 is a graph of the level of free acid (FA) generated in the aluminum clean process detailed in Example 5.

On Day 2, cans remained water break free and clear finger wipe test, Fluoride and FA remained consistent and within set parameters (FIGS. 7 and 8). Conductivity set point of stage 2 needed to be raised to 14200 mS and then to 14800 mS and finally to 15500 mS to maintain Free Acid levels. Fluoride set point was adjusted up and down many times between 14 and 18 seconds before settling on 15 seconds per 3000 cans.

On Days 3-7, cans remained water break free with no quality concerns, FA and Fluoride remained constant. Cleaner set point increased to 16200 mS. Fluoride set point remained at 15 s per 3000 cans.

On Days 8-12, Cans remained water break free with no quality concerns, FA and Fluoride remained constant. Cleaner set point remained 16200 mS. Fluoride set point remained at 15 s per 3000 cans.

On Days 13-15, Fluoride and free acid were increased slightly to assist with reducing aluminium build up on the decorator mandrels. At this time it is not thought that this issue was product related, however it will have slightly impacted on the consumptions during the trial period.

Etch rates were measured before the trial using SOLUTION B as the fluoride source and during the trial using DA-ACP-112 as the fluoride source. Results are below, no discernable difference was found.

TABLE 7

| Can ID | Fluoride Source | Before weight (g) | After weight (g) | Weight loss (mg) |
|---|---|---|---|---|
| C1 | SOLUTION B | 12.4500 | 12.4455 | 4.5 |
| C2 | SOLUTION B | 12.6217 | 12.6176 | 4.1 |
| C4 | SOLUTION B | 12.6339 | 12.6297 | 4.2 |
| C5 | SOLUTION B | 12.5950 | 12.5911 | 3.9 |
| C6 | SOLUTION B | 12.6314 | 12.6276 | 3.8 |
| | AVERAGE | | | 4.1 |

TABLE 8

| Can ID | Fluoride Source | Before weight (g) | After weight (g) | Weight loss (mg) |
|---|---|---|---|---|
| C1 | DA-ACP-112 | 12.4260 | 12.4213 | 4.7 |
| C2 | DA-ACP-112 | 12.6174 | 12.6129 | 4.5 |
| C3 | DA-ACP-112 | 12.4104 | 12.4068 | 3.6 |
| C5 | DA-ACP-112 | 12.5152 | 12.5115 | 3.7 |
| C7 | DA-ACP-112 | 12.4374 | 12.4334 | 4.0 |
| | AVERAGE | | | 4.1 |

Consumption of DA-ACP-112 over the full trial duration was 43 Kg/M compared to a previous month's average 33 Kg/M on SOLUTION B. Consumptions were approximately 30% higher than SOLUTION B.

The fluoride set point was increased gradually over the first 48 hours from 11 s per 3000 cans to 18 s before finally settling on 15 s per 3000 cans. Dosing time was approximately 26% higher than when using SOLUTION B.

Cleaner set points were raised from 13450 mS to 16200 mS over the duration of the trial. Consumptions were slightly increased at 114 Kg/M compared to the prior month's average of 97 Kg/M.

Further laboratory work is conducted on the need for increased cleaner set point.

Figure 9:
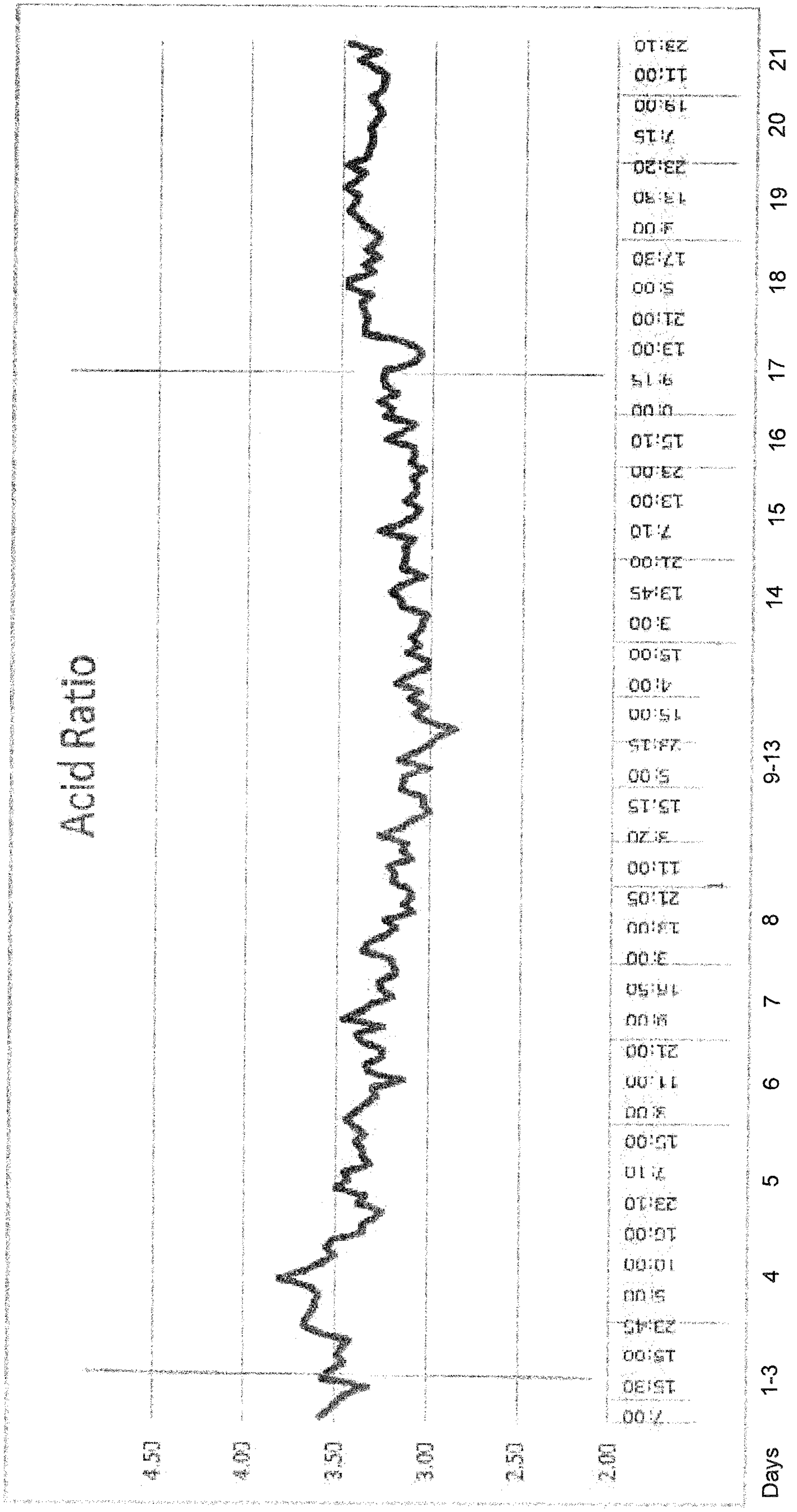
FIG. 9 is a graph of the acid ratio in the aluminum clean process detailed in Example 5.

Acid ratio dropped slightly during the trial (FIG. 9). Total acid reduced from around 30 mls to around 26/27 mls despite maintaining free acid levels. Further laboratory work on the reduced total acid values observed is conducted.

Can quality remained consistent before during and after the trial, can samples taken before the trial for comparison were visually the same quality as during the trial period. Enamel rating values remained well below cut-off limits before and during and the trial with a batch average of 0.32 MA pre-trial and 0.33 MA during the trial on category 1 lacquer weights using AQUALURE 900 inside spray lacquer.

In conclusion, during the 14 day trial DA-ACP-112 produced cans of an equal quality to SOLUTION B with no increase in ME readings or change in visual appearance of the final can. DA-ACP-112 can replace SOLUTION B or SOLUTION C and significantly reduce the risk exposure of employees to toxic hydrofluoric acid. SOLUTION B or SOLUTION C can be replaced with no change to quality control parameters or laboratory methods.

Example 6: KF Solution

In another trial, similar to those that described in Example 2, a 30% KF solution was used in place of SOLUTION B or SOLUTION C or the DA-ACP-112 to etch aluminum samples. A 1% solution of the cleaner was made and 100 and 200 ppm of various fluoride sources added.

Figure 10:
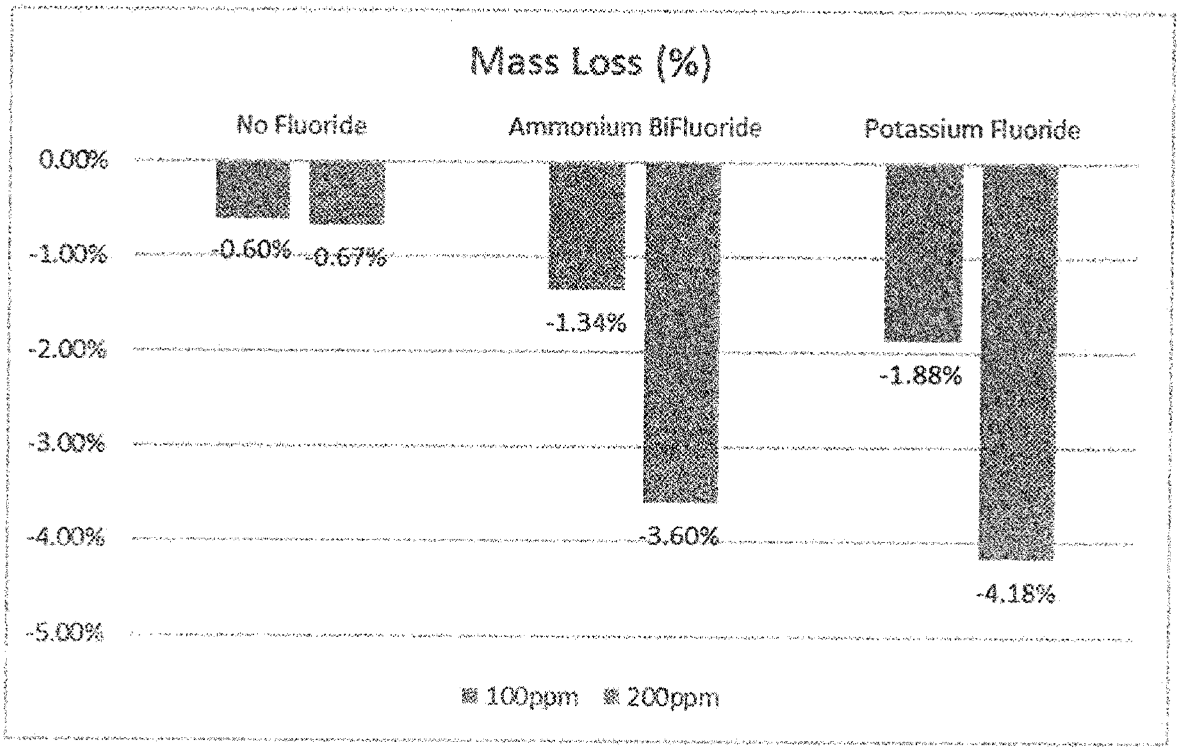
FIG. 10 is a graph showing mass loss (%) of metal under tests with no fluoride, ammonium bifluoride, and potassium fluoride. In each test the leftmost bar represents concentration of 100 ppm of the fluoride and the rightmost bar represents 200 ppm of the fluoride.

Etch rates were measured before the trial using a control (no fluoride ion), ammonium bifluoride as the fluoride source, or potassium fluoride as the fluoride source. Etching tests were conducted to compare loss of aluminum under these conditions. The bar graph of FIG. 10 summarizes the results. In each test the leftmost bar represents concentration of 100 ppm of the fluoride and the rightmost bar represents 200 ppm of the fluoride. Etch rates were measured and summarized in FIG. 10. FIG. 10 demonstrates that the KF solution achieves oxide removal similar to the slightly higher etch rates comp The 30% KF solution has similar low toxicity benefits to the neutral accelerator; but the neutral accelerator is more beneficial to reduce toxicity in common industrial practices. The KF option is useful in situations where the customers waste water plant can't process ammonium or where local regulations limit ammonium discharge. The use of KF alone allows the method to occur in the absence of ammonium ions. However, one drawback of KF alone is the volume and expense in contrast to the neutral accelerator.

All publications and patent applications cited in this specification, particularly U.S. Provisional Patent Application No. 62/593,650, filed Dec. 1, 2017, are incorporated herein by reference. While the invention has been described with reference to particular embodiments, it will be appreciated that modifications can be made without departing from the spirit of the invention. Such modifications are intended to fall within the scope of the appended claims.

The invention claimed is:

1. A product or kit for cleaning aluminum or aluminum alloy containers comprising:
   (a) a first container comprising an acidic wash stage solution having no fluoride ions and a pH<2.5, wherein solution (a) is a concentrate comprising about 30-50% by weight inclusive of sulfuric acid and about 10-15% inclusive of surfactant in water;
   (b) a second container comprising a stable accelerator solution, wherein the stable accelerator solution comprises a neutralized ammonium bifluoride-containing solution containing about 10-20% inclusive by weight potassium fluoride, and about 10-20% inclusive by weight ammonium fluoride in water, wherein the stable accelerator solution is stable at between about 0° C. to about 50° C. having a pH of between about 6-7, inclusive, and wherein the stable accelerator solution is in an amount sufficient to supply the wash stage solution with between 3 to 15 ppm fluoride ion;

wherein admixture of solution (b) with solution (a) forms a cleaning composition that removes organic and inorganic contaminants from said containers, does not alter the pH of the acidic wash stage solution, and reduces exposure of humans to toxic levels of hydrofluoric acid or ammonium bifluoride.

2. The product or kit according to claim 1, wherein the ammonium bifluoride solution is stabilized with potassium hydroxide.

3. The product or kit according to claim 2, wherein the accelerator solution is formed by mixing a solution of about 17% by weight of ammonium bifluoride in water and a solution of about 45% by weight potassium hydroxide in water, which is added until all HF is neutralized.

4. The product or kit according to claim 1, wherein said accelerator solution contains about 18% inclusive by weight potassium fluoride and about 11% inclusive by weight ammonium fluoride in water.

* * * * *